(12) United States Patent
Motozawa et al.

(10) Patent No.: US 7,240,920 B2
(45) Date of Patent: Jul. 10, 2007

(54) VEHICLE OCCUPANT KNEE PROTECTION APPARATUS

(75) Inventors: Yasuki Motozawa, Wako (JP); Daisuke Fuji, Wako (JP); Hidekazu Nishimura, Tokyo (JP); Yoichi Amano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/476,131

(22) Filed: Jun. 28, 2006

(65) Prior Publication Data

US 2006/0290123 A1  Dec. 28, 2006

(30) Foreign Application Priority Data

Jun. 28, 2005  (JP)  ............................. 2005-188433

(51) Int. Cl.
*B60R 21/045* (2006.01)
(52) U.S. Cl. ........................ 280/752; 280/753
(58) Field of Classification Search ............... 280/752, 280/753
See application file for complete search history.

(56) References Cited

FOREIGN PATENT DOCUMENTS

| JP | 05221276 A | * | 8/1993 |
|---|---|---|---|
| JP | 2001-122061 A | | 5/2001 |

* cited by examiner

*Primary Examiner*—Faye M. Fleming
(74) *Attorney, Agent, or Firm*—Arent Fox LLP

(57) ABSTRACT

A vehicle occupant knee protection apparatus for protecting the knees of an occupant when collision energy acts on a vehicle. The occupant knee protection apparatus comprises a knee protection member, a contact force detector, a controller, and a drive unit. The knee protection member is disposed in an opposable position to knees of an occupant seated in a vehicle seat. The contact force detector detects the contact force of the knees on the knee protection member. The controller performs control that reduces the contact force to a force control target value and that maintains the reduced value. The drive unit moves the knee protection member in the front/rear direction of the vehicle on the basis of an output signal from the controller.

3 Claims, 8 Drawing Sheets

VEHICLE OCCUPANT KNEE PROTECTION APPARATUS

FIELD OF THE INVENTION

The present invention relates to a vehicle occupant knee protection apparatus whereby knees are protected by mitigating collision energy that acts on the knees of a vehicle occupant in a collision.

BACKGROUND OF THE INVENTION

In recent years, progress has been made in the development of occupant protection apparatuses for protecting occupants when collision energy acts on a vehicle. As a part of this type of occupant protection, efforts are being made to develop an occupant knee protection apparatus for a vehicle whereby knees are protected by mitigating collision energy that acts on the knees of an occupant.

For example, efforts are being made to develop occupant knee protection apparatuses for a vehicle provided with a passive energy-absorbing structure that has a knee protection member in the front area of the vehicle interior. When collision energy acts on the vehicle from the front direction, the knees of the occupant move forward due to inertia and make contact with the knee protection member. The contact force can be absorbed and the knees protected when the knee protection member is elastically deformed by the impact force (contact force).

There are also many techniques for more actively protecting knees such as that disclosed in Japanese Patent Laid-Open Publication No. 2001-122061. A general overview of the conventional occupant knee protection apparatus for a vehicle described in Japanese Patent Laid-Open Publication No. 2001-122061 is described with reference to FIG. 10 hereof, schematically illustrating the conventional occupant knee protection apparatus.

Figure 10:
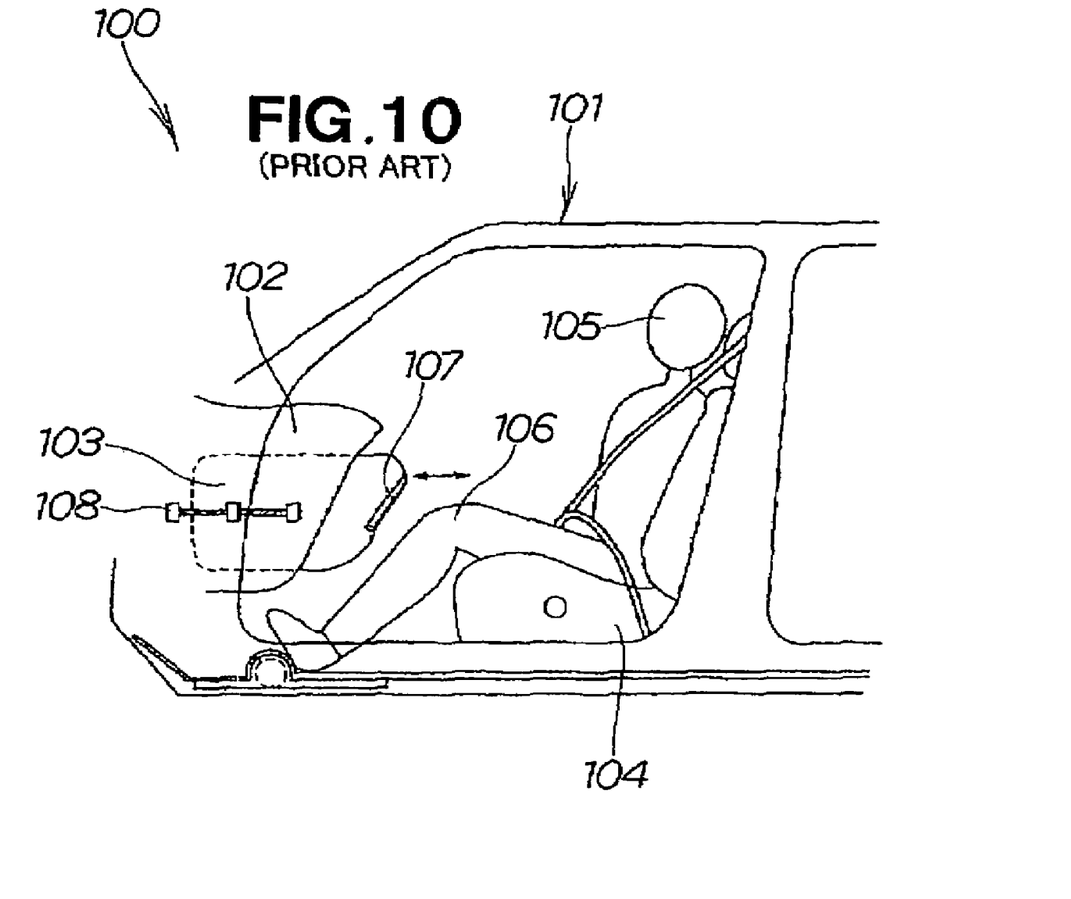
FIG. 10 is a schematic view of a conventional vehicle occupant knee protection apparatus.

The conventional occupant knee protection apparatus for a vehicle 100 shown in FIG. 10 has a knee protection member 103 that is movable in the front/rear direction of the vehicle body and is mounted on the instrument panel 102 of a vehicle 101.

In accordance with the occupant knee protection apparatus for a vehicle 100, when the ignition switch is switched on, the distance from the knee protection member 103 to the knees 106 of the occupant 105 seated in a seat 104 is detected by using a position detector 107, and the knee protection member 103 is moved toward the knees 106 by using an electric motor so that the distance is brought to a prescribed fixed value.

In other words, the movement distance of the knees 106 during a collision can be reduced by reducing the gap between the knee protection member 103 and the knees 106.

When collision energy acts on the vehicle 101 from the forward direction, the knees 106 of the occupant 105 move forward a distance equal to the above-described fixed value, and strike the knee protection member 103. The knee protection member 103 absorbs the collision energy that acts on the knees 106 by being displaced in the forward direction of the vehicle body in accordance with the impact force (collision energy) of the knees 106. As a result, the knees 106 can be protected.

In the conventional occupant knee protection apparatus for a vehicle 100 described above, however, there is no change in the fact that the structure is a passive energy-absorbing structure in which the knee protection member 103 is displaced in the forward direction of the vehicle in accordance with the impact force of the knees 106 on the knee protection member 103.

In an actual collision, the deceleration of the vehicle 101 after collision energy has acted on the vehicle is not necessarily fixed and often varies in a complicated manner. Even if the gap between the knee protection member 103 and the knees 106 is set in advance to be a fixed value, the effect of the inertia of the knees 106 varies in the course of events after a collision. However, such a passive energy-absorbing structure still has room for improvement so that the desired energy-absorbing characteristics can always be stably assured even if the initial collision velocity and deceleration of the vehicle 101 at the point of collision has varied.

If the force at which the knee protection member 103 starts to be displaced in the forward direction of the car, i.e., the displacement start force, is set to a low level, the load on the knees 106 and thighs can be reduced. When the displacement start force is low, however, the distance the occupant 105 moves forward while seated increases, i.e., the forward movement distance increases.

There is, therefore, also a need for a technique whereby the forward movement distance of the occupant can be reduced.

SUMMARY OF THE INVENTION

The present invention provides an occupant knee protection apparatus for a vehicle to protect the knees of an occupant when collision energy acts on the vehicle, the apparatus comprising a knee protection member that is disposed in an opposable position to knees of the occupant seated in a vehicle seat, and that reduces collision energy that acts on the knees; a contact force detector for detecting the contact force of the knees against the knee protection member; a controller for issuing a control signal so as to reduce the contact force to a force control target value set in advance and to maintain the reduced value, on the basis of a detection signal of the contact force detector; and a drive unit for moving the knee protection member in the front/rear direction of the vehicle in accordance with the control signal of the controller.

For this reason, energy can be actively absorbed in the occupant knee protection apparatus for a vehicle according to the present invention, i.e., (i) when the contact force is high, the knee protection member is retracted away from the knees to absorb energy, and (ii) when the contact force is relatively low, the knee protection member is kept in its current position or is moved toward the knees to maintain a contact force.

More specifically, in the occupant knee protection apparatus for a vehicle, a contact force can be rapidly and reliably reduced to a force control target value, and the reduced value can be maintained. Stabilized energy-absorbing performance by the knee protection member can therefore be adequately assured. As a result, the load on the knees and thighs of the occupant can be further reduced in an adequate manner. The forward movement distance of the occupant can be reduced because the contact force that has been reduced to the force control target value can be kept at the reduced value.

Furthermore, the knee protection member does not move toward the knees prior to collision energy acting on the vehicle. For this reason, the occupant does not feel annoyance under ordinary conditions, and comfort can be maintained.

The drive unit preferably comprises an actuator for driving the knee protection member in the front/rear direction of the vehicle in accordance with the control signal, and a damper for supplementing the drive force of the actuator; and the damper supplements the drive force of the actuator when at least the actuator is driving the knee protection member in the retracting direction away from the knees.

The knee protection member is retracted from the knees by an actuator when the contact force is large. In this case, the driving force of the actuator may be supplemented by a damper. The maximum driving force of the actuator can be reduced by configuring the structure in this manner. Drive performance can be assured by using a compact, low-cost actuator having a low driving force. For this reason, the contact force can be controlled with good efficiency.

The force control target value even more preferably comprises an initial target value at an initial point at which the knees make contact with the knee protection member, and an end target value at an end point that follows the initial target value; and the initial target value is higher than the end target value.

In this manner, overshooting (going too far) can be sufficiently controlled when the contact force is reduced to the force control target value because the contact force is reduced by being divided into two-tier target values of small and large magnitudes. Therefore, in an actual collision, the contact force can be reduced to the force control target value in a short period of time even during considerable disturbance when the deceleration of the vehicle varies or conditions otherwise change after collision energy has acted on the vehicle. As a result, energy can be uniformly absorbed beginning at the point at which the knees of the occupant move forward and make contact with the knee protection member, and ending at the point at which the contact force is reduced and maintained at the force control target value. Stabilized energy-absorbing performance by the knee protection member can be more adequately assured.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
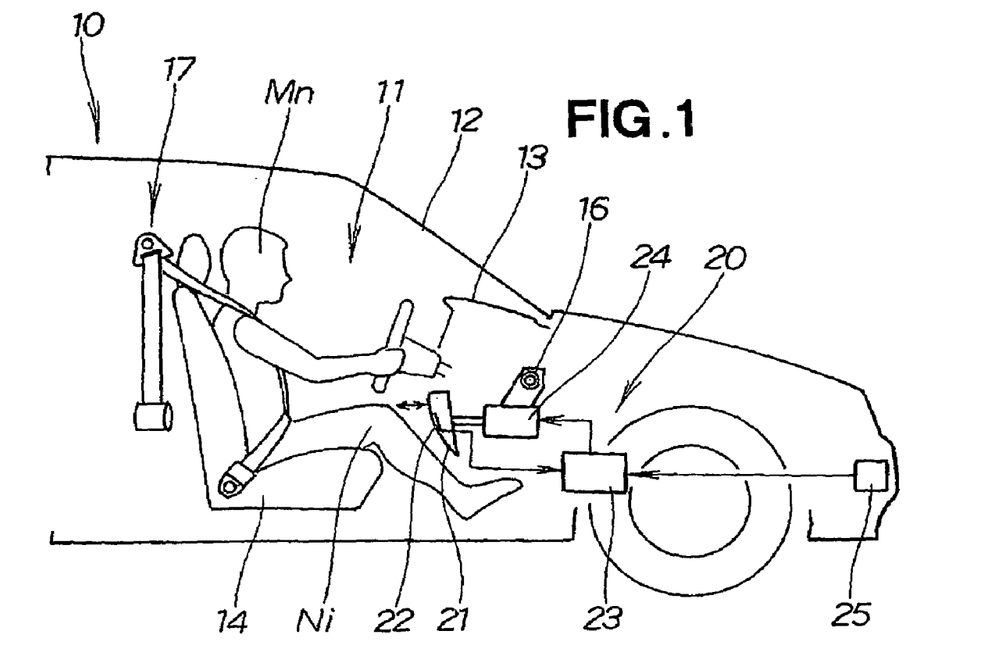
FIG. 1 is a side view of a vehicle in which the vehicle occupant knee protection apparatus according to the present invention is provided to the front area of the vehicle interior.
Figure 2:
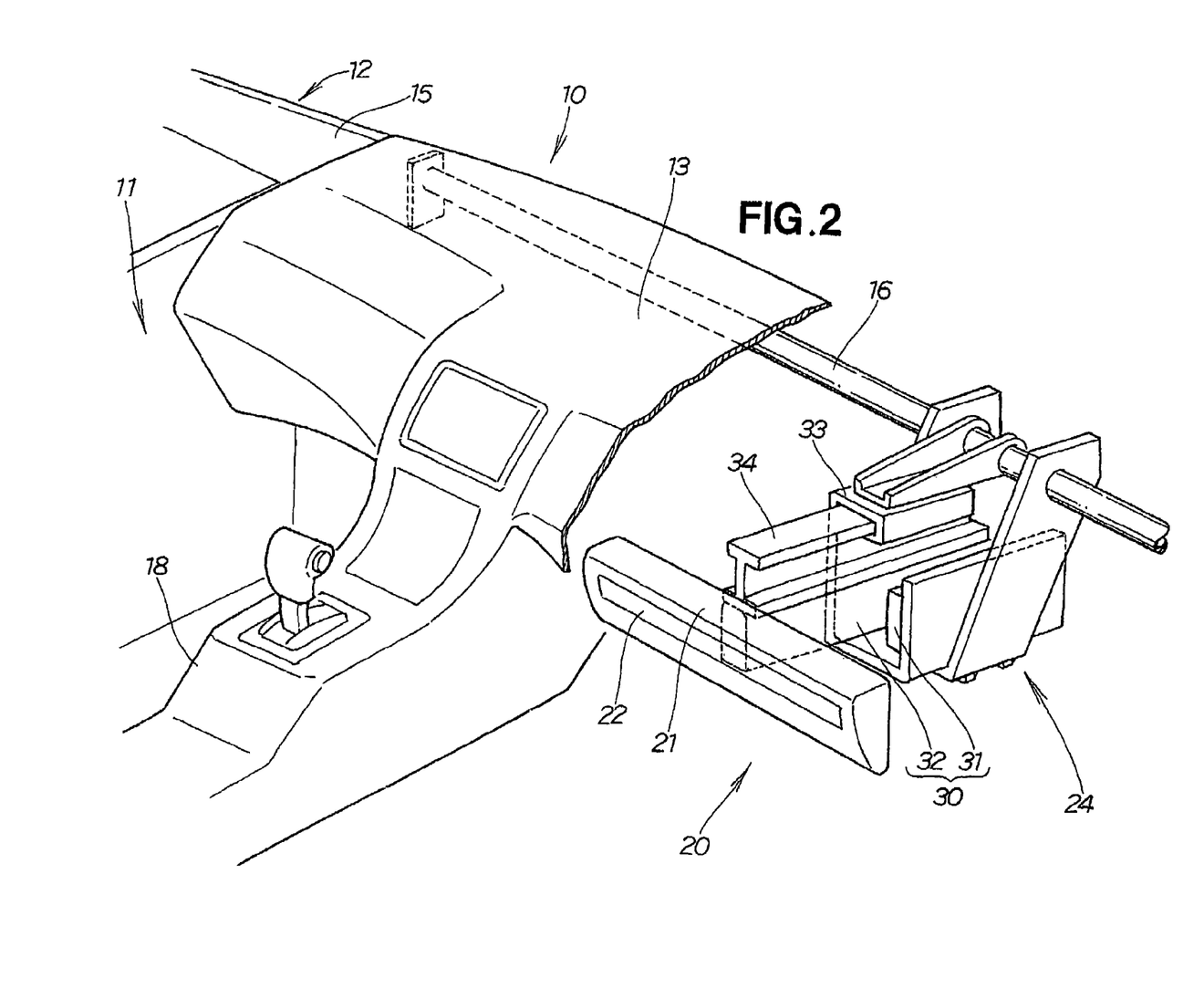
FIG. 2 is a perspective view of the vehicle interior and the occupant knee protection apparatus of FIG. 1.

A vehicle 10 is provided with an instrument panel 13 mounted on a vehicle body 12 in the front area of a vehicle interior 11, an occupant knee protection apparatus 20, and an acceleration sensor 25, as shown in FIGS. 1 and 2.

The instrument panel 13 is disposed in front of the occupant Mn seated in a seat 14, and is provided with an occupant knee protection apparatus 20 for protecting the left and right knees Ni of the occupant Mn. The occupant Mn is the driver seated in the driver's seat 14, for example.

The vehicle body 12 has a fixed bar 16 suspended between the left and right front pillars 15 the further forward on the vehicle body than the instrument panel 13. The fixed bar 16 is a round pipe, round rod, or another rod-shaped fixed member that extends parallel to the width direction of the vehicle. The vehicle 10 is provided with a console box 18 and a seat belt apparatus 17 for restraining the seated occupant Mn.

The occupant knee protection apparatus 20 reduces, by way of a knee protection member 21, collision energy that acts on the knees Ni when the energy is applied to the vehicle 10. More specifically, the occupant knee protection apparatus 20 is provided with a knee protection member 21, a contact force detector 22, a controller 23, and a drive unit 24. The knee protection member 21 is disposed in an opposable position to the knees Ni of an occupant Mn seated in the seat 14.

An acceleration sensor 25, for example, can be used to detect that collision energy has acted on the vehicle 10.

Figure 3:
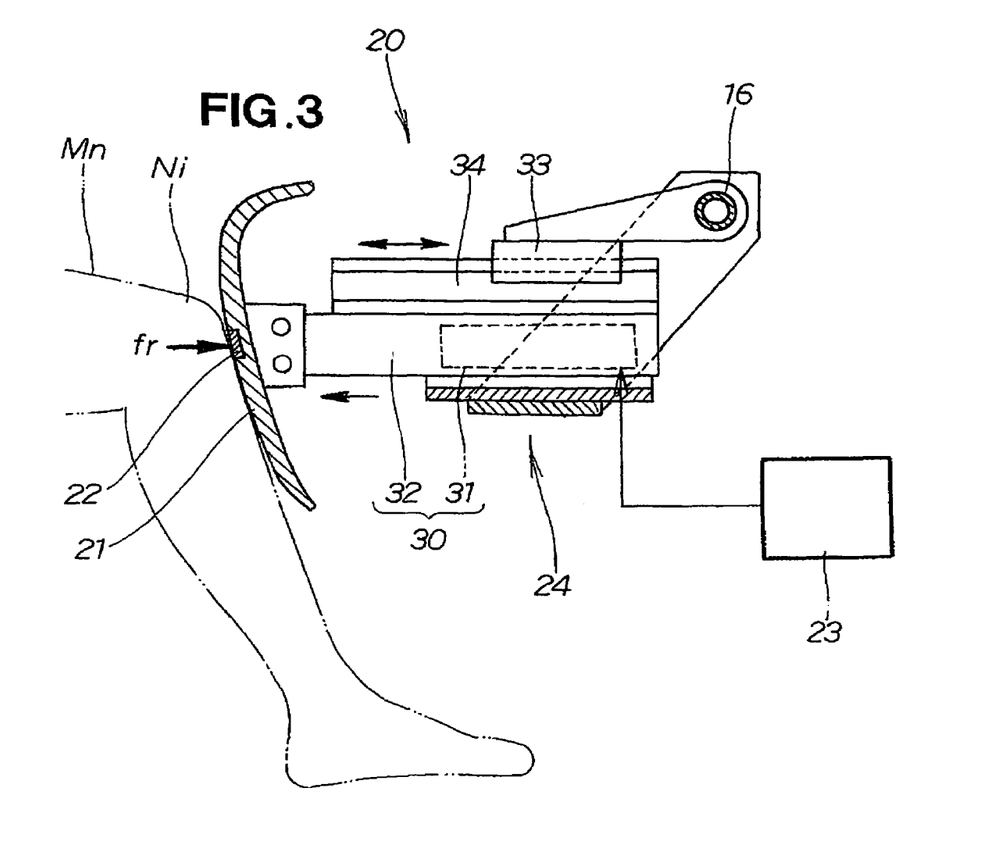
FIG. 3 is a cross-sectional view of the occupant knee protection apparatus of FIG. 2, as seen from the side.

The knee protection member 21 is a knee support for accommodating impact to the knees Ni when the knees Ni make contact with the member, as shown in FIGS. 2 and 3. The member is composed of a resin molded article that is long and thin in the width direction of the vehicle, for example, and is also referred to as a knee bolster. The knee protection member 21 is a member that can pass through an opening (not shown) in the instrument panel 13 and move in the front/rear direction of the vehicle.

The contact force detector 22 is a sensor that detects the pressing force fr on the knee protection member 21 in the forward direction of the vehicle, i.e., the so-called contact force fr (hereinafter referred to as "actual contact force fr") of the knees Ni against the knee protection member 21, and issues a detection signal when the knees Ni of the occupant Mn move forward and strike the knee protection member 21.

The contact force detector 22 can be provided to the knee protection member 21 so as to detect the actual contact force fr as the displacement of an elastic body, and to issue an electric detection signal that corresponds to the actual contact force fr. The detector may comprise a strain gauge embedded in the knee protection member 21, for example.

The contact force detector 22 has no limitations in terms of detection method and structure as long as the detector has sufficient detection accuracy and responsiveness, and the inertial mass is sufficiently small so as not to upset control. Also, the contact force detector 22 is preferably disposed in the knee protection member 21 in a position that is close to the surface opposite from the knees Ni so that the inertial mass of the knee protection member 21 does not upset control by the controller 23.

The controller 23 carries out so-called active control by issuing a control signal on the basis of the detection signal of the contact force detector 22 so as to reduce the actual contact force fr to a preset force control target value and to maintain the reduced value. The control method used by the controller 23 is a feedback control method, for example.

The drive unit 24 moves the knee protection member 21 in the front/rear direction of the vehicle so as to absorb the collision of the knees Ni against the knee protection member 21 and to keep the actual contact force fr in an optimal state by moving the knee protection member 21 in the front/rear direction of the vehicle in accordance with a control signal from the controller 23. Such a drive unit 24 may be considered to be a force generator. The drive unit 24 comprises an actuator 30 mounted on a fixed bar 16, which is a part of the vehicle body 12.

More specifically, the actuator 30 is a linear motor (also referred to as "a linear servomotor") that linearly moves in the front/rear direction of the vehicle, and comprises a stationary member 31 mounted on the fixed bar 16, and a movable member 32 assembled so as to be capable of movement in the front/rear direction of the vehicle with respect to the stationary member 31. The knee protection member 21 is mounted at one end of the movable member 32.

The fixed bar 16 is provided with a guide rail 33. The guide rail 33 is a member whereby a slider 34 provided to the movable member 32 is guided in the front/rear direction of the vehicle. For this reason, the fixed bar 16 can be mounted by way of the guide rail 33 and slider 34 so as to allow the movable member 32 to move in the front/rear direction of the vehicle.

It is apparent from the above description that the knee protection member 21 is mounted on the fixed bar 16 by way of the actuator 30.

The linear motor can be an electromagnetic linear motor, an ultrasonic motor, or another electrostrictive linear motor, for example, as long as the motor has sufficient output, stroke (distance), and responsiveness to control the actual contact force fr.

Control flow for the case in which a microcomputer is used as the controller 23 shown in FIG. 3 is described next with reference to FIG. 4. The control flow begins when the ignition switch (not shown) is switched on, for example, and ends when the ignition switch is switched off. The controller 23 houses a timer. A description is provided below with reference to FIGS. 1 to 3.

Step (hereinafter abbreviated as "ST") ST01: Initialize settings. More specifically, keep the time in an OFF state, set the timer count time Tc to 0, set the flag F to 0, and maintain the OFF state of the actuator.

ST02: Read the detection signal of the acceleration sensor 25. The acceleration sensor 25 issues an ON detection signal when collision energy has acted on the vehicle 10.

ST03: Determine whether the acceleration sensor 25 is ON. If YES, advance to ST04. If NO, return to ST02.

ST04: Detect the actual contact force fr. The detection signal detected by the contact force detector 22 may be read to determine the actual contact force fr.

ST05: Determine whether the actual contact force fr is equal to or greater than a fixed, preset reference contact force fs (i.e., whether the actual contact force has reached the magnitude of the reference contact force fs.). If YES, advance to ST06. If NO, go to ST13. ST13 is described later.

In this step, the reference contact force fs is a value that is less than the force control target value fc0 described below, and is set in the following manner. In other words, the reference contact force fs is a value at which it is determined that an excessive load has been placed on knees Ni and thighs of the occupant Mn by the knee protection member 21 being pressed in the forward direction of the vehicle when collision energy that acts on the vehicle 10 causes the knees Ni of the occupant to move forward and strike the knee protection member 21.

ST06: Determine whether the timer is stopped. If YES, advance to ST07. If NO, determine that the time is counting and go to ST08.

ST07: Start the timer.

ST08: Determine whether the count time Tc (elapsed time Tc) has exceeded a fixed, preset reference time Ts. If YES, advance to ST09. If NO, go to ST10. The reference time Ts is set to a time that allows overshooting to be inhibited when feedback control is performed so as to reduce the actual contact force fr.

ST09: Set the force control target value fc0 to a fixed, preset initial target value fc1. The initial target value fc1 is the target value at the starting point at which the knees Ni make contact with the knee protection member 21.

ST10: Set the force control target value fc0 to a fixed, preset end target value fc2. The end target value fc2 is the target value at the end point that follows the initial target value fc1.

ST11: The actuator 30 is driven and controlled by the force control target value fc0.

ST12: Invert the flag F to 1 because control of the actual contact force fr by the actuator 30 has started, and then return to ST04.

The actual contact force fr is reduced to the force control target value fc0 by repeating steps ST04 to ST11 in this manner, and a control signal is issued to the actuator 30 and the actuator 30 is controlled by feedback so as to maintain the reduced value.

ST13: Stop the actuator 30 because the actual contact force fr is less than the reference contact force fs.

ST14: Determine whether the flag F is 1. If YES, end control by the controller 23. If No, return to ST04. In other words, since the actual contact force fr is less than reference contact force fs, it is determined that collision conditions requiring control of the actual contact force fr have ended, resulting in a YES determination.

It is apparent from the above description that the force control target value fc0 is set to the initial target value fc1 or the end target value fc2 in accordance with the conditions. The initial target value fc1 is the target value at the initial point at which the knees Ni make contact with the knee protection member 21. The end target value fc2 is the target value at the end point that follows the initial target value fc1. The initial target value fc1 is a larger value than the end target value fc2 (fc1>fc2). Thus, the force control target value fc0 is divided into two target values, i.e., an initial target value fc1 and an end target value fc2.

Figure 4:
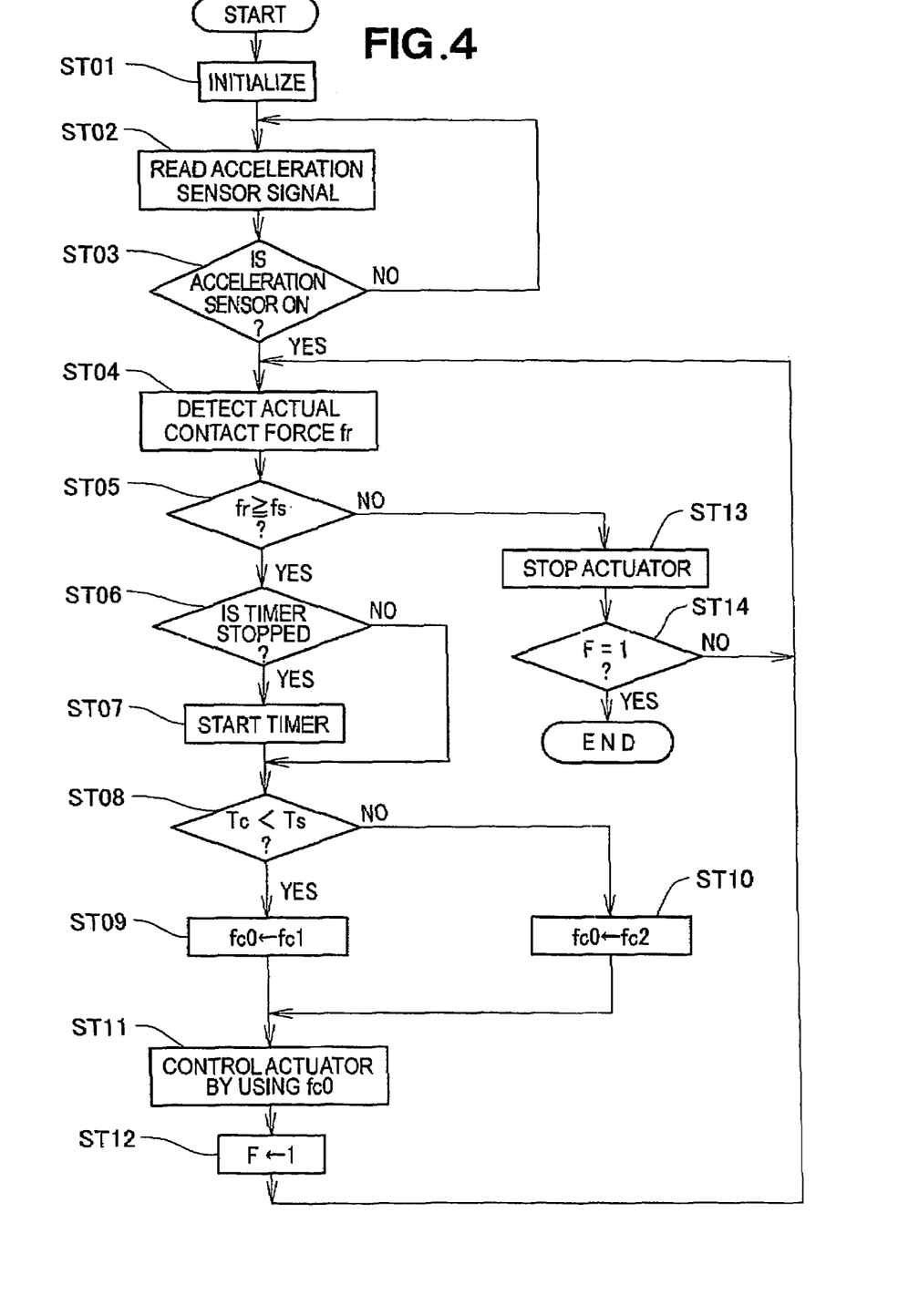
FIG. 4 is a control flowchart of a controller of the knee protection apparatus.

Following is a summary of the control flow shown in FIG. 4.

First, the acceleration sensor 25 detects that collision energy has acted on the vehicle 10 (ST02 to ST03), after which the contact force detector 22 continues to detect the actual contact force fr (ST04).

The controller 23 determines whether the detected actual contact force fr has reached the magnitude of the reference contact force fs (ST05). When the actual contact force fr is a negligible value in relation to the reference contact force fs, the controller 23 does not drive the actuator 30 (ST13 to ST14).

On the other hand, when the actual contact force fr is a large value that has reached the magnitude of the reference contact force fs (ST05), the controller 23 sets the force control target value fc0 to the initial target value fc1 over the fixed time period Ts (ST06 to ST08). The controller 23 drives and controls the actuator 30 on the basis of the force control target value fc0 (ST11).

When a fixed period of time Ts has elapsed, the controller 23 sets the force control target value fc0 to the end target value fc2 (ST10). The controller 23 then drives and controls the actuator 30 on the basis of the force control target value fc0 (ST11).

When the actual contact force fr thereafter decreases and has dropped below the reference contact force fs, the controller 23 stops the actuator 30 (ST13).

The following is a summary of the above description.

The present inventors, as a result of studying optimal control theory, found that the occupant knee protection apparatus 20 can minimize load on the knees Ni and thighs when the knee protection member 21 is actively controlled so that the contact force fr (i.e., actual contact force fr) between the knee protection member 21 and the knees Ni remains constant.

In view of the above, feedback control is carried out so that the actual contact force fr is kept at a fixed, preset value fc0 (force control target value fc0) by carrying out prescribed computations on the basis of the detection signal of the contact force detector 22.

The occupant knee protection apparatus 20 is based on such an approach. When collision energy has acted on the vehicle 10, the knees Ni of the occupant Mn move forward due to inertia and are in continuous contact (i.e., continue to have impact) with the knee protection member 21. In the occupant knee protection apparatus 20, (1) the actual contact force fr is constantly detected by the contact force detector 22 when the knees Ni are in contact with the knee protection member 21, (2) the controller 23 issues a control signal to the drive unit 24 on the basis of the detection signal, and (3) the drive unit 24 moves the knee protection member 21 in the front/rear direction of the vehicle.

In other words, the occupant knee protection apparatus 20 has an active energy-absorbing structure in which the actual contact force fr is held constant by (i) moving the knee protection member 21 away from the knees Ni to absorb energy when the actual contact force fr is considerable, and (ii) keeping the knee protection member 21 in its current position or moving the member toward the knees Ni when the actual contact force fr is relatively low.

By providing such a configuration, the actual contact force fr can be rapidly and reliably reduced to the force control target value fc0, and the reduced value can be maintained. Therefore, the energy-absorbing performance stabilized by the knee protection member 21 can be adequately assured. As a result, the load on the knees Ni and thighs of the occupant Mn can be more adequately reduced. Also, since the actual contact force fr thus reduced to the force control target value fc0 can be maintained at the reduced value, the forward movement distance of the occupant Mn can be reduced.

Furthermore, before collision energy acts on the vehicle 10, the knee protection member 21 does not move toward the knees Ni, and the occupant Mn does not therefore feel annoyance under ordinary conditions, and comfort can be maintained.

The contact force characteristics of the occupant knee protection apparatus 20 are described next on the basis of FIG. 5 while referring to FIGS. 1 to 3.

Figure 5:
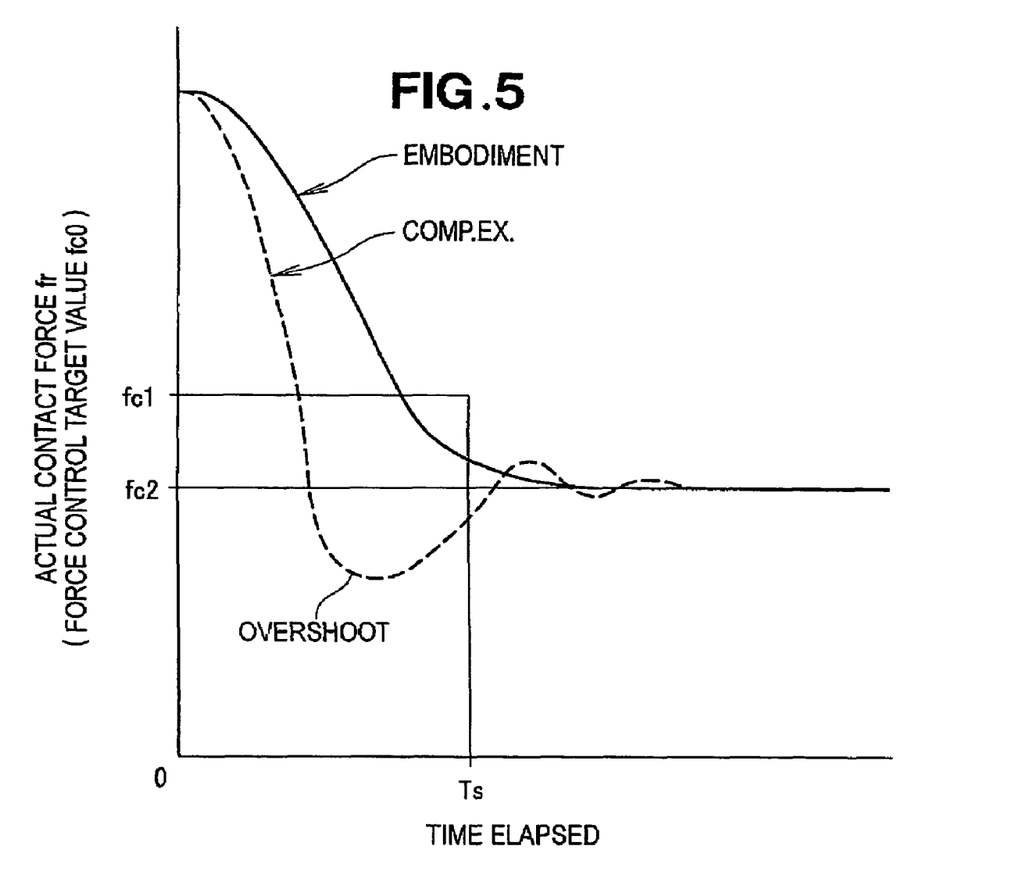
FIG. 5 is a graph of contact force characteristics of the occupant knee protection apparatus.

FIG. 5 is a diagram of the contact force characteristics of the occupant knee protection apparatus for a vehicle, wherein the horizontal axis represents the elapsed time, and the vertical axis represents the actual contact force fr and the force control target value fc0. The diagram shows the characteristics according to which the actual contact force fr is reduced. In FIG. 5, the curve indicated by the broken line shows the contact force characteristics of a comparative example. The curve indicated by the solid line shows the contact force characteristics of the embodiments.

In the comparative example, the force control target value fc0 is set to a single value, i.e., the end target value fc2. The force control target value fc0 of the comparative example is set to the end target value fc2, which is a very low value, beginning at the initial point at which the knees Ni make contact with the knee protection member 21 and ending at the end point. For this reason, when the actual contact force fr is controlled so as to be reduced to the force control target value fc0, overshooting (going too far) may occur.

In contrast, in the present embodiments, the initial target value fc1 is set as the force control target value fc0 in the initial period in which the knees Ni make contact with the knee protection member 21, and the end target value fc2 is then set as the force control target value fc0 at a time Ts at which the actual contact force fr decreases to near the initial target value fc1 (including cases in which the value is equal to fc1 or is above or below this value).

In other words, in the occupant knee protection apparatus 20 of the present invention, the actual contact force fr is reduced to the initial target value fc1, which is a relatively large value, at the initial point at which the knees Ni make contact with the knee protection member 21, and the actual contact force fr is then reduced to the end target value fc2, which is a value that is less than the initial target value fc1.

Thus, in the present invention, the force control target value fc0 is divided into two target values, i.e., an initial target value fc1 and an end target value fc2, and the contact force is reduced in accordance with these target values. Overshooting can therefore be sufficiently reduced when the actual contact force fr is lowered to the force control target value fc0.

Therefore, in an actual collision, the actual contact force fr can be reduced to the force control target value fc0 in a short period of time even during considerable disturbance when the deceleration of the vehicle 10 varies or conditions otherwise change after collision energy has acted on the vehicle. As a result, energy can be uniformly absorbed beginning at the point at which the knees Ni of the occupant Mn move forward and make contact (have impact) with the knee protection member 21, and ending at the point at which the actual contact force fr is reduced and maintained at the force control target value fc0. Stabilized energy-absorbing performance by the knee protection member 21 can be more adequately assured.

In other words, in addition to the final end target value fc2, convergence (reduction to zero) of the actual contact force fr can be accelerated by setting an initial target value fc1 as a primary target value, and the kinetic energy of the occupant Mn can be reliably reduced beginning at the initial point. As a result, it is possible to reduce the increase in the actual contact force fr due to residual kinetic energy of the occupant Mn that occurs after the deceleration of the vehicle body 12 has ended.

Convergence of the actual contact force fr to the end target value fc2 can be further accelerated by appropriately setting one or more intermediate target values, i.e., setting target values at multiple stages between the initial target value fc1 and end target value fc2.

Described next are examples in which the configuration of the occupant knee protection apparatus 20 has been modified. The modified examples have the same basic configuration as the occupant knee protection apparatus 20 of the embodiment shown in FIGS. 1 to 5, the same reference numerals are used for the same components, and a description of the components is omitted.

As described above, the occupant knee protection apparatus 20 shown in FIG. 3 is configured to directly detect the actual contact force fr that acts on the knee protection member 21 by using the contact force detector 22. In contrast to the aforementioned configuration, the occupant knee protection apparatus for a vehicle according to the first and second modified examples described below is configured to indirectly detect the actual contact force fr. The details are described below.

Figure 6:
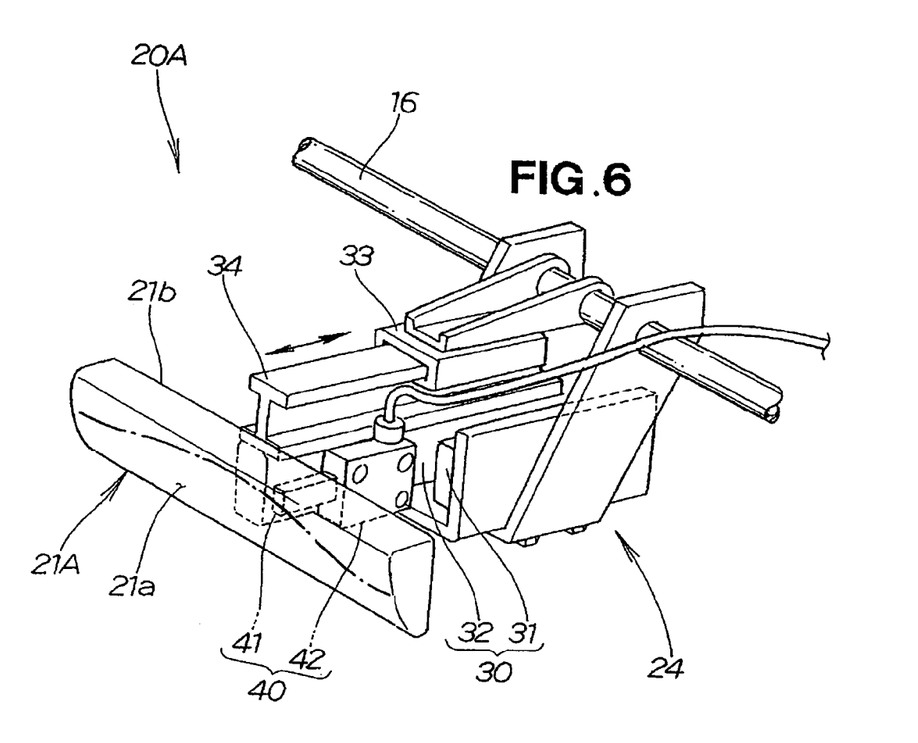
FIG. 6 is a perspective view of the occupant knee protection apparatus according to a first modification of the present invention.

The occupant knee protection apparatus 20A of the first modified example is configured to indirectly detect the actual contact force fr by using a linear encoder 40, as shown in FIG. 6.

The knee protection member 21A of the first modified example is configured so that the contact portion 21a (surface portion 21a) disposed facing the knees Ni shown in FIG. 3 elastically deforms in the front/rear direction of the vehicle in accordance with the actual contact force fr, and the base portion 21b that is on the opposite side of the contact portion 21a does not substantially elastically deform in comparison with the contact portion 21a.

The linear encoded 40 detects the extent to which the contact portion 21a elastically deforms in accordance with the actual contact force fr, ard issues a detection signal. The linear encoder 40 comprises a movable member 41 connected to the contact portion 21a, and a stationary member 42 connected to the base portion 21b.

The linear encoder 40 counts, for example, the number of pulses that corresponds to the deformation distance and issues a pulse count value. The controller 23 (see FIG. 1) of the first modified example converts the pulse count value issued by the linear encoder 40 into a modified velocity to allow the actual contact force fr to be estimated (i.e., indirectly computed) on the basis of the modified velocity.

Figure 7:
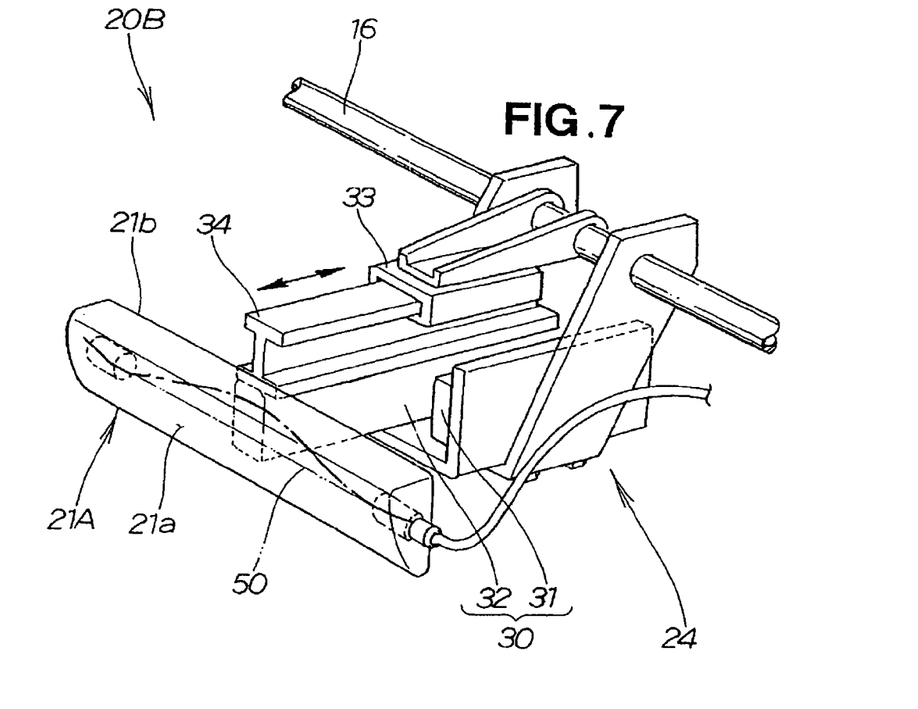
FIG. 7 is a perspective view of the vehicle occupant knee protection apparatus according to a second modification of the present invention.

The occupant knee protection apparatus 20B of the second modified example indirectly detects the actual contact force fr by using a fiber optic strain gauge 50, as shown in FIG. 7. The knee protection member 21A of the second modified example has the same members as the first embodiment described above.

The fiber optic strain gauge 50 detects the extent (stroke) to which the contact portion 21a elastically deforms in accordance with the actual contact force fr, and issues a detection signal. By mounting a fiber optic strain gauge 50 on the contact portions 21a, the distance that the contact portion 21a elastically deforms can be detected from the variation in the index of refraction produced by the deformation of the optical fiber, which undergoes elastic deformation together with the contact portion 21a. The controller 23 (see FIG. 1) can estimate (indirectly compute) the actual contact force fr on the basis of the deformation distance detected by the fiber optic strain gauge 50.

Thus, the controller 23 of the first and second modified examples can estimate (indirectly compute) the actual contact force fr on the basis of the detection signal of the fiber optic strain gauge 50 shown in FIG. 7 and the linear encoder 40 shown in FIG. 6. In other words, the actual contact force fr is estimated in ST04 shown in FIG. 4.

The occupant knee protection apparatuses 20A and 20B of the first and second modified examples perform in the same manner as the occupant knee protection apparatus 20 shown in FIGS. 1 to 5, and have the same effect.

The linear encoder 40 and fiber optic strain gauge 50 are units for estimating contact force that detect the actual contact force fr by performing an estimation. The contact force estimation unit can also be considered to have the same configuration as the contact force detector. In addition to the linear encoder 40 and the fiber optic strain gauge 50, other configurations can be adopted for the contact force estimation unit.

The drive unit 24 of the occupant knee protection apparatus 20 shown in FIG. 3 is configured with only an actuator 30. In contrast, the occupant knee protection apparatuses for a vehicle according to the third and fourth modified examples described below have a structure in which the drive unit 24 is a combination of the actuator 30 and a damper 60. A detailed description follows.

Figure 8:
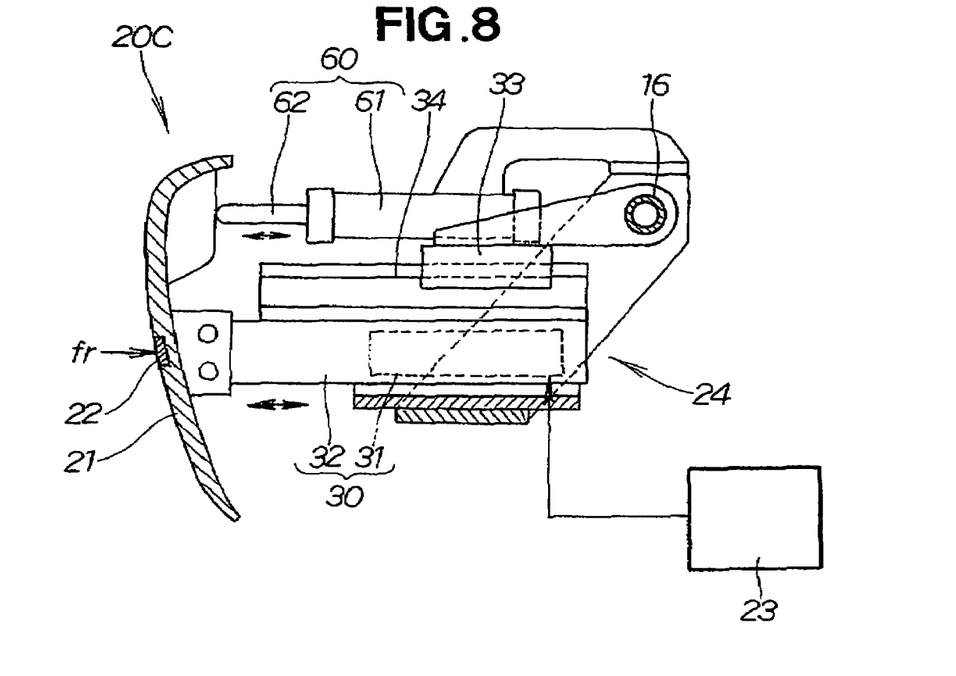
FIG. 8 is a cross-sectional side view of the occupant knee protection apparatus according to a third modification of the present invention.

The drive unit 24 in the occupant knee protection apparatus 20C of the third modified example comprises an actuator 30 and a damper 60, as shown in FIG. 8.

The actuator 30 drives the knee protection member 21 in the front/rear direction of the vehicle in accordance with a signal from the controller 23, as described above. The damper 60 is a dampening unit that supplements the driving force of the actuator 30. The damper comprises a cylinder 61 mounted on the fixed bar 16, and a piston 62 that is set so as to press against the rear surface of the knee protection member 21. The damper 60 can be a common liquid-seal damper that forces a liquid material sealed in the cylinder 61 via an orifice.

The drive unit 24 of the third modified example has a structure in which the actuator 30 actively absorbs energy in accordance with a control signal of the controller 23, and the damper 60 passively absorbs energy.

The occupant knee protection apparatus 20D of the fourth modified example has the same configuration as the third modified example described above, as shown in FIG. 9, and the distal end of the piston 62 in the damper 60 is connected to the rear surface of the knee protection member 21.

Figure 9:
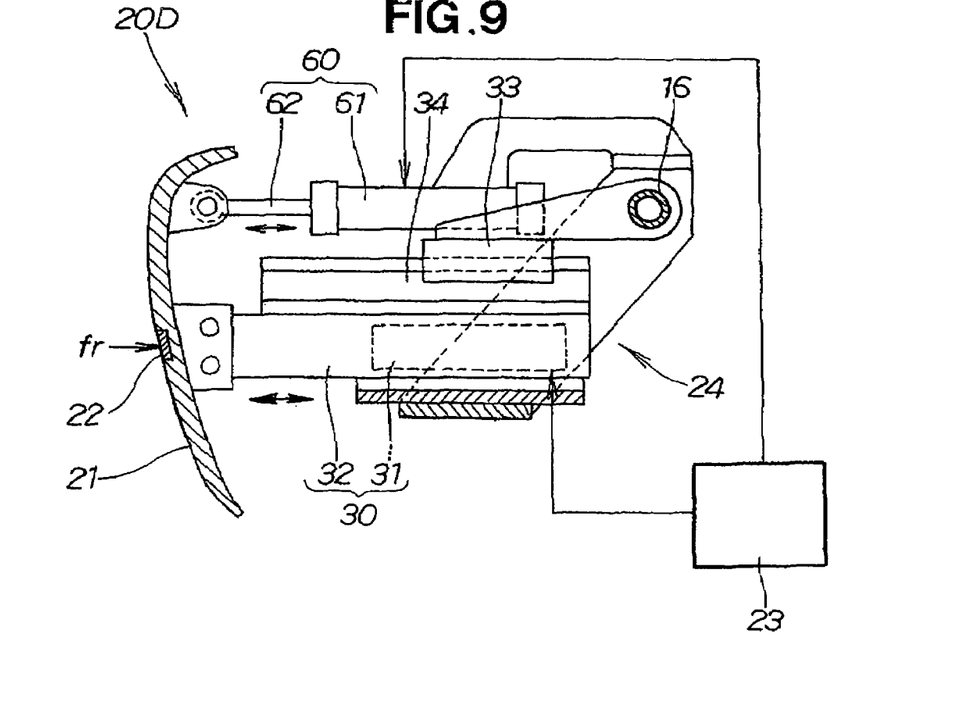
FIG. 9 is a cross-sectional side view of the occupant knee protection apparatus according to a fourth modification of the present invention.

The drive unit 24 of the fourth modified example has a structure in which energy is even more actively absorbed and in which the actuator 30 and damper 60 both actively absorb energy in accordance with the control signal of the controller 23. In other words, the controller 23 of the fourth modified example controls both the actuator 30 and the damper 60 in ST11 shown in FIG. 4 described above.

In this case, an active damper that varies the dampening factor by the application of a magnetic fluid, an electroviscous fluid, or another fluid can be used as the damper 60. By adopting such a structure, the dampening characteristics can be set so as to conform with the optimal force control target value fc0 that is set in accordance with the velocity at which the knees Ni strike the knee protection member 21, or in accordance, for example, with the operating condition of the seat belt apparatus 17, an airbag, or another occupant-restraining apparatus. As a result, optimal control can be achieved in a wider range of conditions.

The occupant knee protection apparatuses 20C and 20D of the third and fourth modified examples perform in the same manner as the occupant knee protection apparatus 20 shown in FIGS. 1 to 5, and have the same effect.

In the third and fourth modified examples, the drive unit 24 comprises an actuator 30 for generating driving force in accordance with a control signal of the controller 23, and a damper 60 (dampening unit 60) for supplementing the driving force of the actuator 30 when at least the actuator 30 is driving the knee protection member 21 in the direction away from the knees Ni show in FIG. 3.

When the actuator 30 holds the knee protection member 21 in its current position, or advances the member toward the knees Ni, the actual contact force fr can be considered to be relatively low. In this case, the driving force of the actuator 30 does not need to be supplemented by the damper 60.

Conversely, when the actuator 30 retracts from the knees Ni, the actual contact force fr can be considered to be large. In this case, the driving force of the actuator 30 may be supplemented by the damper 60.

By adopting such as configuration, the maximum driving force of the actuator 30 can be reduced. The same drive performance as that of the drive unit 24 shown in FIG. 3 described above can be assured by using a compact low-cost actuator 30 having a low driving force. For this reason, the actual contact force fr can be controlled with good efficiency.

In the present invention, the occupant knee protection apparatus 20 shown in FIGS. 1 to 5 and the occupant knee protection apparatuses 20A to 20D of the modified examples can be appropriately combined.

The occupant knee protection apparatuses 20, and 20A to 20D may be configured so that the values described in (a) to (c) below are set in advance, and the controller 23 may be configured to carry out the same control operations as in the embodiment and modified examples described above.

(a) The mass of the knee protection member 21 and the mass of the movable member 32 of the actuator 30

(b) The spring constant (contact rigidity) between the knee protection member 21 and the knees Ni when the knees Ni have made contact with the knee protection member 21

(c) The dampening factor of the actual contact force fr

In the occupant knee protection apparatuses 20, and 20A to 20D, the state of the load (electric current consumption) placed on the drive unit 24 can be detected by a load condition detector (not shown). The controller 23 estimates the actual contact force fr on the basis of the state of the load detected by the load condition detector, and performs control operations in the same manner as in the embodiments and modified examples described above.

The drive unit 24 may also be configured having another actuator with a different driving method in addition to the above-described actuator 30, and the two can be used to drive the knee protection member 21.

The occupant knee protection apparatuses 20 and 20A to 20D of the present invention can be used in occupant protection apparatuses that offer better protection for the occupant Mn when collision energy has acted on an automobile or another vehicle 10.

Obviously, various minor changes and modifications of the present invention are possible in light of the above teaching. It is therefore to be understood that within the scope of the appended claims the invention may be practiced otherwise than as specifically described.

What is claimed is:

1. A vehicle occupant knee protection apparatus for protecting the knees of an occupant when collision energy acts on a vehicle, said apparatus comprising:
   a knee protection member that is disposed in an opposable position to knees of an occupant seated in a vehicle seat, and that reduces collision energy that acts on the knees;
   a contact force detector for detecting the contact force of the knees against the knee protection member;
   a controller for issuing a control signal so as to reduce the contact force to a force control target value set in advance and to maintain the reduced value, on the basis of a detection signal of the contact force detector; and
   a drive unit for moving the knee protection member in the front/rear direction of the vehicle in accordance with the control signal of the controller.

2. The protection apparatus of claim 1, wherein
   the drive unit comprises an actuator for driving the knee protection member in the front/rear direction of the vehicle in accordance with the control signal, and a damper for supplementing the drive force of the actuator; and
   the damper supplements the drive force of the actuator when at least the actuator is driving the knee protection member in the retracting direction away from the knees.

3. The protection apparatus of claim 1, wherein
   the force control target value comprises an initial target value at an initial point at which the knees make contact with the knee protection member, and an end target value at an end point that follows the initial target value; and
   the initial target value is higher than the end target value.

* * * * *